United States Patent
Fontignie et al.

(10) Patent No.: US 9,176,982 B2
(45) Date of Patent: Nov. 3, 2015

(54) SYSTEM AND METHOD FOR CAPTURING AN IMAGE OF A SOFTWARE ENVIRONMENT

(75) Inventors: Jacques Fontignie, Onex (CH); Claudio Marinelli, Latina (IT); Marc Vuilleumier Stueckelberg, Geneva (CH)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 13/383,200

(22) PCT Filed: Apr. 29, 2010

(86) PCT No.: PCT/EP2010/055833
§ 371 (c)(1),
(2), (4) Date: Mar. 23, 2012

(87) PCT Pub. No.: WO2011/003640
PCT Pub. Date: Jan. 13, 2011

(65) Prior Publication Data
US 2012/0185427 A1     Jul. 19, 2012

(30) Foreign Application Priority Data
Jul. 10, 2009    (EP) .................................... 09165126

(51) Int. Cl.
*G06F 17/30*    (2006.01)
*G06F 11/14*    (2006.01)

(52) U.S. Cl.
CPC ...... *G06F 17/30238* (2013.01); *G06F 11/1435* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 5,832,274 A | 11/1998 | Cutler et al. | |
| 6,279,011 B1 * | 8/2001 | Muhlestein | 707/999.202 |
| 6,934,755 B1 | 8/2005 | Saulpaugh et al. | |
| 7,356,679 B1 | 4/2008 | Le et al. | |
| 8,209,290 B1 * | 6/2012 | Dowers et al. | 707/640 |
| 8,209,680 B1 * | 6/2012 | Le et al. | 717/174 |
| 8,635,429 B1 * | 1/2014 | Naftel et al. | 711/206 |
| 8,639,897 B1 * | 1/2014 | Brocco et al. | 711/162 |
| 2003/0154220 A1 | 8/2003 | Cannon | |
| 2006/0010314 A1 * | 1/2006 | Xu | 713/2 |
| 2006/0036941 A1 * | 2/2006 | Neil | 715/526 |
| 2007/0011374 A1 * | 1/2007 | Kumar et al. | 710/105 |
| 2008/0082593 A1 | 4/2008 | Komarov et al. | |

(Continued)

FOREIGN PATENT DOCUMENTS

| | | |
|---|---|---|
| EP | 2 053 509 A2 | 4/2009 |
| WO | 2007/103141 A2 | 9/2007 |
| WO | 2011/003640 A1 | 1/2011 |

OTHER PUBLICATIONS

International Search Report from application No. PCT/EP2010/055833 mailed Jun. 30, 2010.
Breuer et al., "The Network Block Device," May 1, 2000, Linux Journal http://www.linuxjournal.com/article/3778, pp. 1-5.

(Continued)

*Primary Examiner* — Richard Bowen
(74) *Attorney, Agent, or Firm* — Zilka-Kotab, PC

(57) ABSTRACT

A method and system for optimally capturing an image on a physical or virtual environment and transferring it to a target system, by leveraging the capabilities of the operating system residing on the source system to manipulate the file system of the source storage device, and by presenting the target data storage as a local simulated disk to the source environment.

15 Claims, 5 Drawing Sheets

(56) References Cited

U.S. PATENT DOCUMENTS

| | | | |
|---|---|---|---|
| 2008/0189361 A1* | 8/2008 | Greschler et al. | 709/203 |
| 2008/0307333 A1* | 12/2008 | McInerney et al. | 715/764 |
| 2010/0325626 A1* | 12/2010 | Greschler et al. | 717/176 |
| 2012/0272238 A1* | 10/2012 | Baron | 718/1 |

OTHER PUBLICATIONS

"VMware Infrastructure 3 Backup and Restore Guide for Dell PowerEdge Servers and PowerVault Storage," 2007 Dell Inc., Nov. 2007, pp. 1-9.

* cited by examiner

SYSTEM AND METHOD FOR CAPTURING AN IMAGE OF A SOFTWARE ENVIRONMENT

RELATED APPLICATIONS

This application claims priority to PCT Patent Appl. No. PCT/EP2010/055833, filed Apr. 29, 2010, and from European Patent. Appl. No. EP/09165126.5, filed Jul. 10, 2009, and which are both herein incorporated by reference.

BACKGROUND

The present invention relates to a method and system for capturing a software image from a source environment and transferring it to a target environment.

As the complexity of Internet Technology (IT) systems and the time to install and configure an environment increases, there is a growing need to efficiently replicate images or environments across multiple systems.

At the most basic level, an image encapsulates the data, applications and operating systems that reside on a physical or virtual machine. Organizations are beginning to view the data centre as a set of portable images instead of a diverse mix of a servers, operating systems, applications and data. The ability to profile, move, copy, protect and replicate these images between physical and virtual hosts is a key enabler for operational efficiency and business success.

One of the key tasks required to migrate an image is the ability to capture the image, moving it to a central repository before customizing and deploying it to other targets. Different methods are available to capture an image each one with its advantages and its drawbacks.

It is possible to read the sectors of the source disk and copy them to the target disk. This is very inefficient as the source disk may be fragmented and some sectors can be empty.

An improved approach is to copy only the allocated sectors or blocks of the source disk. However, if the source disk is fragmented, the process can be inefficient as useless data will be copied as well.

An alternative is to copy files and elements of the source system at the file system level. The advantage is that the output is defragmented on the target system, and it is much faster to execute than the previous methods, as the amount of data to process is smaller. However the copy agents must be able to manage the file systems natively. This is not always possible as there exist many different varieties of file systems and they are often poorly documented.

These techniques can be applied to virtual machines as well. Virtual machines are often handled as files at the hypervisor level. This creates several inefficiencies as the size of the virtual machine footprint on the disk can only grow as the hypervisor is in general unable to detect which hard disk blocks are not used by the virtual machine.

BRIEF SUMMARY

A system according to one embodiment includes a first computer. The first computer includes a first data storage device storing a file, the file being encoded in a first file system format on the first data storage device; a processor configured to run a first operating system with a first application suitable for retrieving all file system attributes associated with the file. The system further includes logic for receiving a first message indicating a locator of a second data storage device; logic for creating a handler to the second data storage device so that the second data storage device appears as a local device to the computer system; logic for instructing the first application to retrieve file data and all file system attributes associated with the file from the first data storage device; and logic for instructing a second application to send the retrieved file data and the retrieved file system attributes to the handler so that the file data and the file system attributes are written on the second data storage device.

A method for capturing a file stored on a first data storage device of a computer system, according to one embodiment, includes receiving a first message indicating a locator of a second data storage device; creating on a computer system a handler to the second data storage device so that the second data storage device appears as a local device to the computer system, the computer system having a file stored on a first data storage device of the computer system, the file being encoded in a first file system format on the first data storage device, the computer system comprising a first operating system with a first application suitable for retrieving all the file system attributes associated with the file; instructing the first application to retrieve file data and all file system attributes associated with the file from the first data storage device; and instructing a second application to send the retrieved file data and the retrieved file system attributes to the handler so that the file data and the file system attributes are written on the second data storage device.

A computer program product according to one embodiment includes a computer readable storage medium having computer readable program code embodied therewith. The computer readable program code includes computer readable program code configured to receive a first message indicating a locator of a second data storage device; computer readable program code configured to create on a computer system a handler to the second data storage device so that the second data storage device appears as a local device to the computer system, the computer system having a file stored on a first data storage device of the computer system, the file being encoded in a first file system format on the first data storage device, the computer system comprising a first operating system with a first application suitable for retrieving all the file system attributes associated with the file; computer readable program code configured to instruct the first application to retrieve file data and all file system attributes associated with the file from the first data storage device; and computer readable program code configured to instruct a second application to send the retrieved file data and the retrieved file system attributes to the handler so that the file data and the file system attributes are written on the second data storage device.

Further aspects of the present invention will become clear to the skilled person upon examination of the drawings and detailed description. It is intended that any additional advantages be incorporated therein.

BRIEF DESCRIPTION OF THE SEVERAL VIEWS OF THE DRAWINGS

Embodiments of the present invention will now be described by way of example with reference to the accompanying drawings in which like references denote similar elements, and in which.

DETAILED DESCRIPTION

Figure 1:
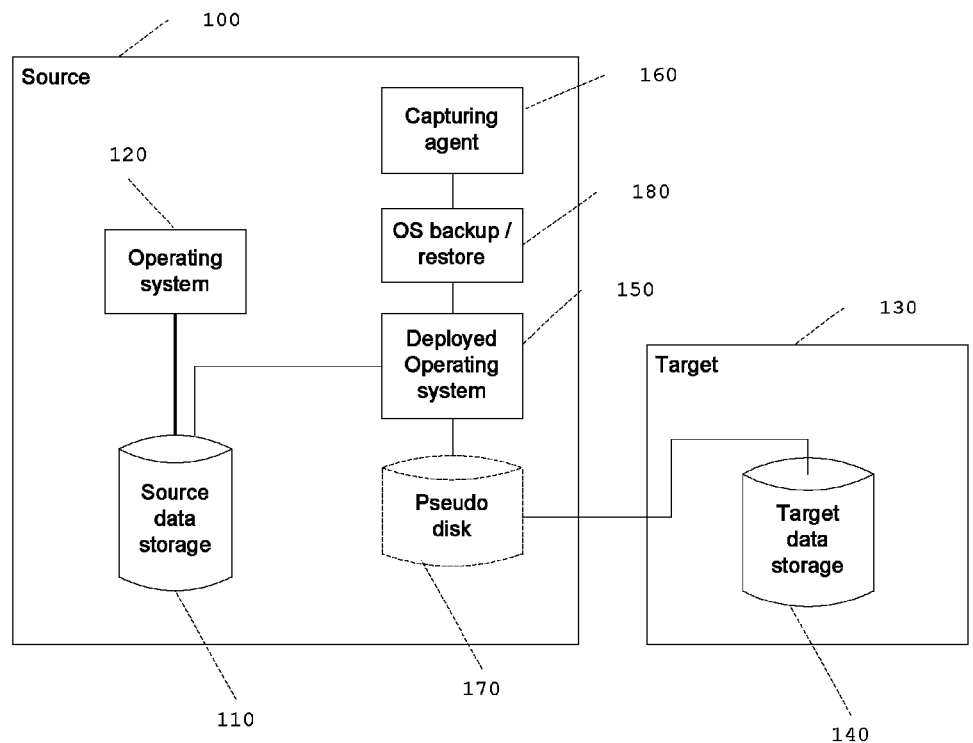
FIG. 1 shows an environment in which an implementation of various embodiments of the present invention can operate.

A system according to one embodiment includes a first computer. The first computer includes a first data storage device of storing a file, the file being encoded in a first file system format on the first data storage device; a processor configured to run a first operating system with a first application suitable for retrieving all file system attributes associated with the file. The system further includes logic for receiving a first message indicating a locator of a second data storage device; logic for creating a handler to the second data storage device; so that the second data storage device appears as a local device to the computer system; logic for instructing the first application to retrieve file data and all file system attributes associated with the file from the first data storage device; and logic for instructing a second application to send the retrieved file data and the retrieved file system attributes to the handler so that the file data and the file system attributes are written on the second data storage device.

An advantage of this aspect is that the target environment does not need to have any knowledge of the file system format in which the file that is included.

A further advantage of this aspect is that access to a network is not required as the target system on which the file would be replicated can be a local disk such as a USB disk.

Yet another advantage of this aspect is that, if the target system is a central repository for storing replicated images, then the server will not become a bottleneck when replicating several images at the same time as most of the processing would happen at the source sites before the data is actually written on to the device handler.

A further advantage of this aspect is that a software component without any knowledge of the underlying file system can leverage the operating system to replicate the file system attributes associated with the file on the target environment, this is particularly important when replicating an operating system which cannot operate without these attributes being set.

In a first development of the first aspect, the method comprises the further step of compressing the file data before sending it to said handler.

An advantage of the first development is that the file replication can happen faster.

In a second development of the first aspect, the method further comprises the steps of:
receiving a message identifying the type of said first operating system;
deploying an agent for running a file capture on a second operating system which is of the same type as said first operating system so that it can manage said first file system format;
booting said second operating system on said computer system, so that said agent executes the steps of the method of the first aspect.

An advantage of the second development is that any file can be captured and replicated without the risk of them being locked, and the agent can be agnostic with respect to the underlying file system which must be replicated.

In a third development of the first aspect, said second storage device is a remote disk.

An advantage is that environments can be duplicated easily over the network.

In a fourth development of the first aspect, the method further comprises the step of formatting said second storage location so that its file system format is the same as said first file system format.

An advantage is that the target environment does not require any knowledge of the file system of the source data storage. Furthermore, the embodiment enables formatting of a remote disk, which is not possible with a network drive.

In the fifth development of the first aspect, a partition is created on said second storage location and said partition is aligned on the block size of said first file system format.

Advantage is that the performance of the replicated environment is greatly increased.

In a sixth development of the first aspect, the steps of receiving and sending are respectively performed by a backup and restore application associated with the operating system.

An advantage is that these applications are usually provided by the operating system which has full knowledge of the file system, thus the applications have no difficulties in retrieving the file system attributes associated with the file that is being captured.

In a seventh development of the first aspect, the computer system is a virtual system and said first data storage device is a virtual disk.

An advantage is that the invention can be applied seamlessly to physical system or to virtual system.

In an eighth development of the first aspect, the handler presents said second data storage device as having a size at least equal to the size of said first data storage device.

An advantage is that the standard system capture mechanism such as back up and restore can be used.

In a ninth development of the first aspect, the method comprises the further steps of:
receiving the master boot record data from said first data storage device; and
sending said master boot record data to said handler so that said master boot record data is written on said second data storage.

Advantage is that all system data relevant for naming the operating system can be captured.

In a tenth development of the first aspect, the method comprises the further steps of:
receiving a list of excluded files which should not be captured from said computer system;
verifying whether said file stored on said first data storage belongs to said list of excluded files;
if said file does not belong to the list of excluded file, starting the file capture process, and otherwise not.

An advantage is that files which are not required for running the operating system, such as temporary files, can be excluded from the system capture thus optimizing the size of the captured image.

In an eleventh development of the first aspect, the file data and said file system attributes are received from said second data storage device and sent to said first data storage device.

An advantage is that there is no use of a central repository, and replication to several target environments can happen at the same time while keeping the load on the source environment low.

According to a second aspect of the present invention, there is provided an apparatus comprising means adapted for carrying out each step of the method according to the first aspect of the invention.

An advantage is that this apparatus can be obtained very easily, thus making the method easy to execute.

According to a third aspect of the present invention, there is provided a computer program comprising instructions for carrying out the steps of the method according to a first aspect of the invention when said computer program is executed on a computer.

An advantage is that the invention can easily be reproduced and run on different computer systems.

According to a fourth aspect of the present invention, there is provided a computer readable medium having encoded thereon a computer program according to the third aspect of the invention.

An advantage is that this medium can be used to easily install the method on various apparatus.

FIG. 1 shows a system comprising:
a source environment (100), comprising:
 a source data storage (110),
 an operating system (120) running on the source environment,
 a deployed operating system (150),
 a capturing agent (160) running on said deployed operating system (150),
 a pseudo disk (170), and
 a backup restore tool (180) provided by the deployed operating system (150); and
a target environment (130), comprising a target data storage (140).

The source data storage (110) comprises data which is to be captured and transferred to the target data storage (140). The deployed operating system (150) is deployed on the source system. It comprises the OS backup/restore tool (180) and the capturing agent (160). The pseudo disk (170) points towards the target data storage (140) on which the data is to be replicated.

The source environment (100) as it is stored in the source data storage (110) is replicated to a target system. The target environment (130) can be a computer system on which the source system runs, or a repository of computer environment images which may be later deployed to other computer systems on which these images will run. The target environment (130) may be local to the source environment (100), such as a USB disk or a local hard disk. Thus, access to a network is not required in this embodiment, as the target system on which the file is replicated can be a local disk such as a USB disk. In another approach, the target environment can be a remote system connected via a network to the source environment (100). The network can be as simple as an Ethernet cable with the source and the target environments being in the same LAN, or the two environments can be very far apart.

The source environment (100) and the target environment (130) can be virtual or physical machines, or any combination of both.

Copying of the source data storage (110) block by block onto the target data storage (140) is inefficient, because empty blocks may be copied, the data may be fragmented and temporary or unused files may be copied as well. This results in an inefficient use of the bandwidth between the source and target environments, and in the waste of storage resources in the target data storage (140). In addition the capture of temporary data can be a privacy and security problem. Block by block copying is especially disadvantageous for physical machines.

Thus the data from the source data storage (110) is preferably retrieved at the file system level for an efficient replication. This way, useless files can be excluded from the capture. Furthermore, files won't be fragmented as they are written on the target data storage, resulting in an optimized use of the storage resources of the target data storage (140). The source environment (100) is thus running when the capture occurs. To avoid locking of files of the operating system (120) to be captured, the source environment may be booted on another operating system. This operating system may be deployed from the network or from a local CD. There exist several operating systems (150) suitable for being deployed on various environments. For example, on Microsoft Windows, WinPE2 can be used; and on Linux, distributions such as LTSP can be used. Such OS may be booted from the network using for instance the PXE protocol. The choice of the operating system (150) to be deployed depends on the type of the operating system (120) on the source environment (100).

The deployed operating system (150) has two main purposes in some embodiments: decode the file system used in the operating system (120) of the source environment (100), and provide an application which is able to retrieve data associated with a file and also the file system attributes associated with the file. Such file system attributes may be required for operating system to operate.

Once the deployed operating system (150) has been fully loaded into the source environment (100) memory, the capturing agent (160) is started. The capture agent (160) then mounts a simulated disk or pseudo disk (170) pointing towards the data storage disk (140) of the target environment (130). The location of the target disk can be provided for instance as a boot parameter to the deployed operating system (150). The pseudo disk (170) makes the target data storage (140) look like a local disk. Data can be read from it and written to it. The target environment, thus, need not have any knowledge of the source file system format. In a preferred embodiment, the presented size of the pseudo disk (170) is at least equal to that of the source data storage. The pseudo disk (170) will be described in more details with respect to FIG. 4.

Based on a description of the data to capture, such as a file list, the capture agent (160) leverages operating system applications to retrieve this data. In a preferred embodiment, a list of excluded files is provided so that these files are not captured. Such files may include files with a .TMP extension, or Pagefile.sys or Hyberfil.sys on a Microsoft Windows operating system. The description can also indicate disk partitions to include or exclude. For example the swap partition in a Linux environment may be excluded. In a preferred embodiment the description of the data to capture comprises the master boot record and boot sectors data. The application is preferably able to capture not only file data but also file metadata such as the file system attributes. In a preferred embodiment, the application is the backup and restore application (180) associated with the operating system. In general, the standard copy application provided by an operating system does not capture file system attributes. In Microsoft Windows environment, the BackupWrite or BackupRead Application Program Interface (API) or Volume Shadow Copy Service (VSS) can be used. In Linux environments the CPIO with the Fuse API can be used. The data is backed up in chunks to a temporary location such as a memory buffer.

The capture agent (160) then instructs the restore application (180) associated with the operating system to write the data from the memory buffer to the pseudo disk (170). Optionally the data can be compressed before it is written to the pseudo disk (170).

The output of the capturing process, in preferred embodiments, is thus a system image, with an optimized size, defragmented, which can be reused on other system with minimal further configuration, such as the IP address, the hostname, the product license keys, etc.

Optionally the capture agent (160) can format the target data storage (140) through the pseudo disk (170) by means of the deployed operating system (150), so that it matches the file system format of the source data storage (110). Furthermore, after the file system format, the partition can be aligned to the block size, which is preferably 2 MB. Thus, a partition may be created on a second storage location and that partition is aligned on the block size of said first file system format. This results in performance of the replicated environment that is greatly increased.

In an alternate embodiment, the capture agent (160) and the pseudo disk (170) are deployed on the target environment; optionally along with the deployed operating system (150) and the backup restore tool (180) if a system reboot is desired or needed. The same principles described above may be applied to such a configuration.

The choice of placing the capture agent on the source (100) or on the target environment (130) may be based on various factors. Preferably, the capture agent (160) and all the other components needed for executing the image capture are deployed on:

- the physical environment if the other one is virtual, to reduce the load on the hypervisor of the virtualized system—in that case, access to the target data storage (140) can be provided by the hypervisor rather than the virtual machine, as the hypervisor has a better bandwidth (the hypervisor does not need to be able to decode the file system format of the image);
- the less powerful environment if the two environments are of the same type (both are physical or virtual).

Figure 2:
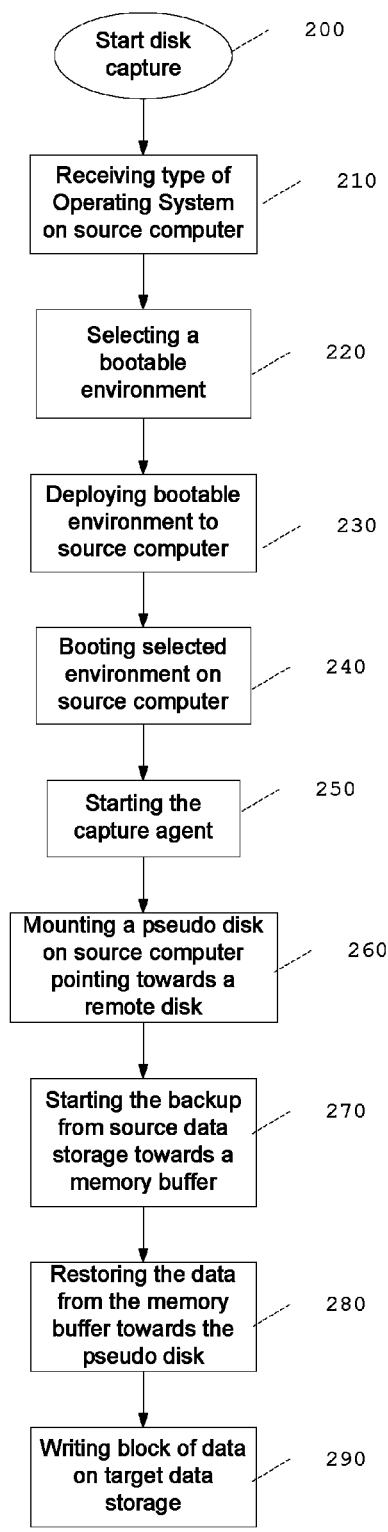
FIG. 2 shows a high-level process for capturing an image from a source environment and replicating it to a target environment.

FIG. 2 depicts a high-level process for capturing an image from a source environment and replicating it to a target environment. The process is as follows:

- starting the disk capture process (200);
- receiving the type of the operating system on the source computer (210);
- selecting a bootable environment (220);
- deploying the bootable environment to the source computer (230);
- booting the selected environment on the source computer (240);
- starting the capture agent on the source environment (250);
- mounting a pseudo disk on the source computer pointing towards a remote disk (260);
- starting the backup from the source data storage to a memory buffer (270);
- restoring the data in the memory buffer towards the pseudo disk (280);
- writing a block of data on the target data storage (290).

After mounting the pseudo disk (170), the capture agent may instruct the operating system (150) to format the target storage device (140). Having the correct file format helps in keeping the file system attributes when replicating an environment.

Booting to another operating system is useful to avoid locking of some operating system files during the capture process. However this may be optional, and the capture agent (160) may be started directly on the original operating system (120) of the source environment (100) in some approaches.

Figure 3:
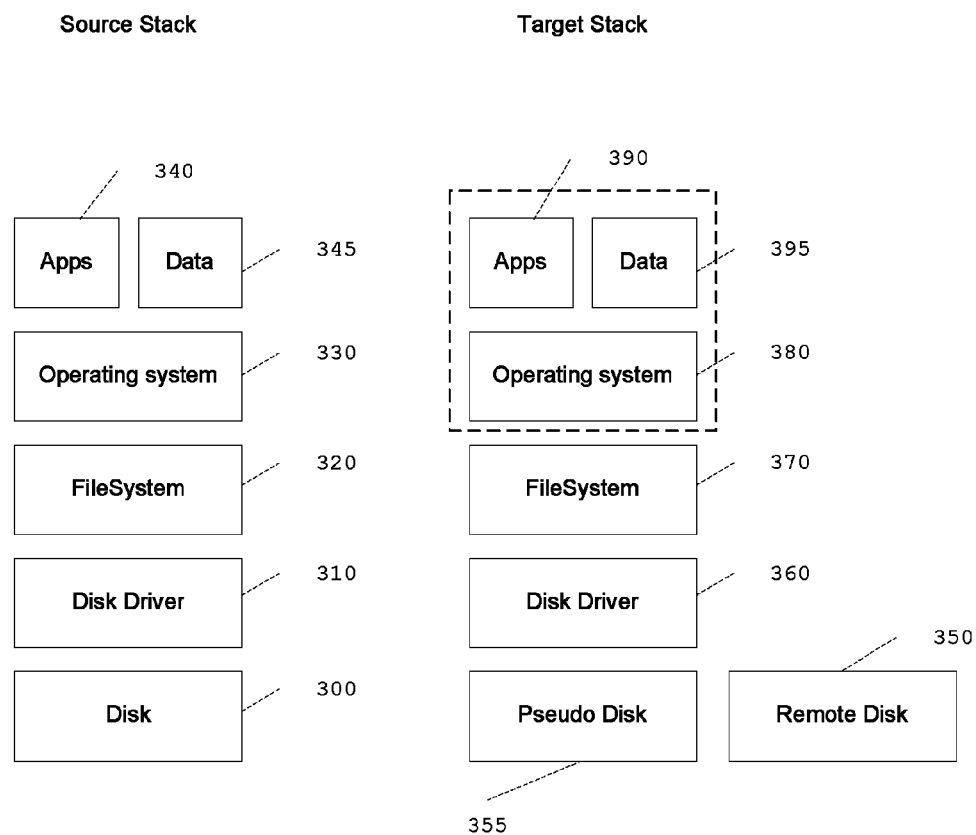
FIG. 3 shows a logical view of the elements from the source stack which get replicated it to the target stack.

FIG. 3 shows a logical view of the elements from the source stack which get replicated to the target stack. The source stack includes:

- a disk (300),
- a disk driver (310),
- a file system (320),
- an operating system (330),
- applications (340) and data (345). The target stack includes:
- a remote disk (350), which may be accessed through a pseudo disk (355) in some approaches,
- a disk driver (360),
- a file system (370), and data which has been replicated from the source stack, including the operating system (380) which may be a subset of the operating system (330) of the source stack, and the applications (390) and data (395).

The replication may be limited to a particular set of folders in one approach, thus enabling to choose which application or data is replicated.

Figure 4:
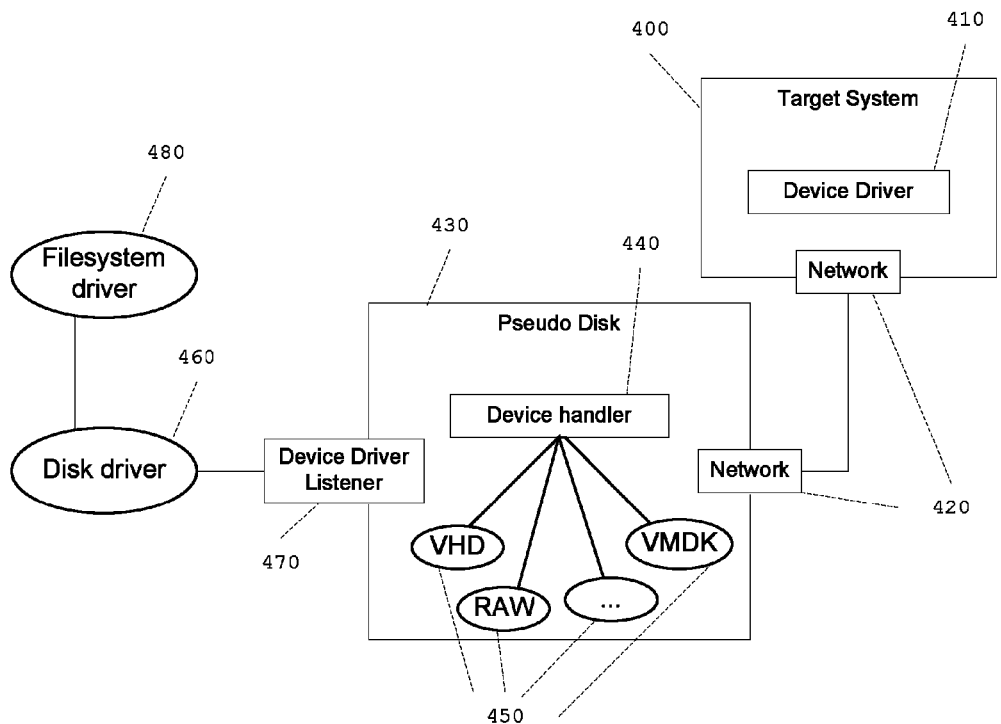
FIG. 4 shows a detailed view of the simulated disk or pseudo-disk.

FIG. 4 shows a detailed view of the simulated disk or pseudo-disk (170) architecture, in one embodiment, and of its connection with the other components. Particularly FIG. 4 shows:

- a target system (400) with a device driver (410) which can be accessed from a network (420);
- a pseudo disk (430), comprising a device handler (440) which can support various disk formats (450), such as VHD, VMDK, VDI, RAW, the pseudo disk being connected to the device driver (410) of the target system (400) over the network (420);
- a disk driver (460), listened by the pseudo disk (430) by a device driver listener (470);
- a device listener (470) for forwarding the requests from the disk driver (460) to the device handler (440) of the pseudo disk (430); and
- a file system driver (480).

The device handler (440) provides simple APIs to read or write on the pseudo disk (430) and to get the size of the disk. Some or all of the requests received by the device handler (440) can be forwarded over the network (420) to the device driver (410) of the target system (400). The device handler may leverage a local cache to avoid network queries. Thus the request to get the size of the disk may be served immediately without further query to the remote disk (140). In a preferred embodiment, the device handler (440) presents a size at least equal to the size of the source data storage (110). The cache may also be used to avoid sending/receiving duplicate blocks, and to avoid transmitting blocks already stored at the target data storage (140) by first submitting to the device driver (410) a Secure Hash Algorithm (SHA) signature of the data block and sending the actual data only if it is new to the device driver (410). This can result in large bandwidth savings.

The device handler (440) can also leverage remote physical disks, for example by using a Network Block Device on Linux, or it can read/write sectors on basic physical disks format over http in an agnostic manner.

Figure 5:
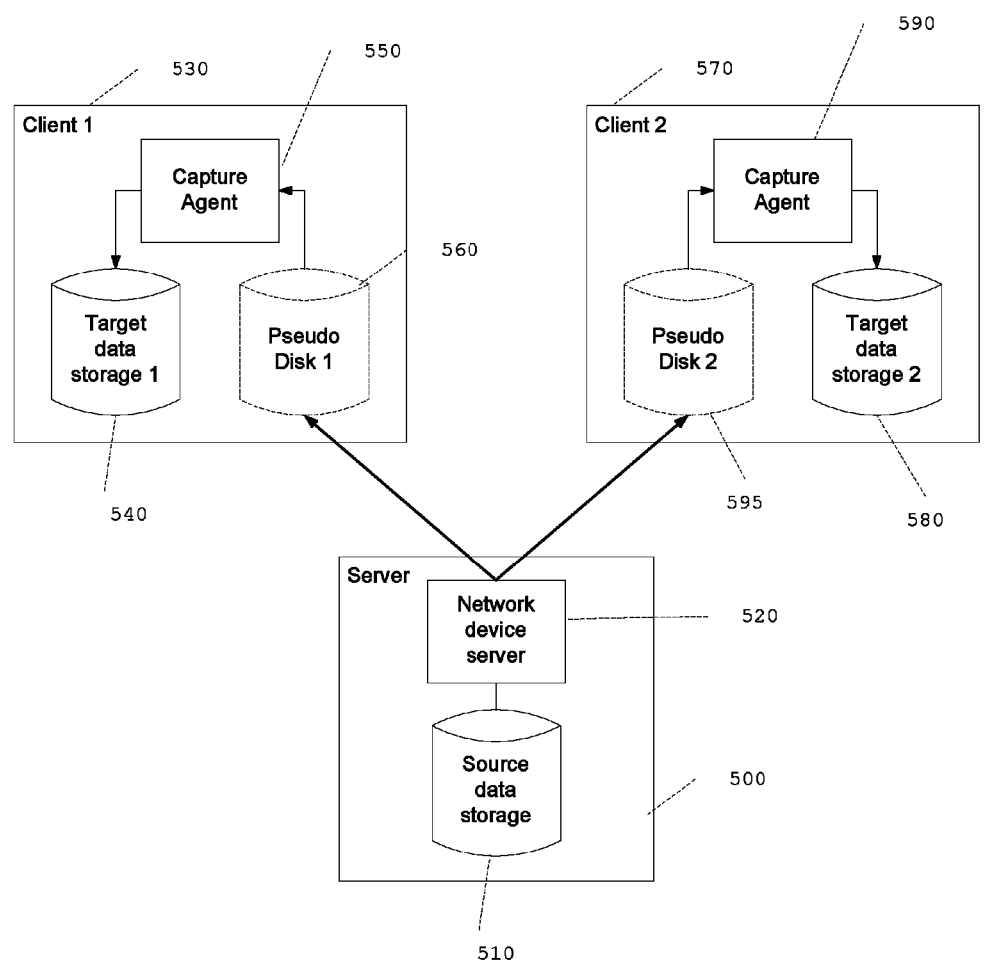
FIG. 5 shows an implementation of the present invention for replicating a source image to multiple target data storages.

FIG. 5 shows an implementation of one embodiment of the present invention for replicating a source image to multiple target data storages. As shown, the implementation includes:

- a source server (500), comprising a source data storage (510) and a network device server (520) for enabling network access to the source data storage (510);
- a first client system (530) comprising a target data storage (540), a capture agent (550) and a pseudo disk (560) mounted by the capture agent (550); and
- a second client system (570), which may be similar to the first client system, the second client system comprising a target data storage (580), a capture agent (590) and a pseudo disk (595) mounted by the capture agent (590).

The capture agents (530, 590) and the pseudo disks (560, 595) may be installed on the operating system of their respective client computer systems (530, 570), or deployed as described with respect to the steps 210 to 260 of FIG. 2.

Both pseudo disks (560, 595) point towards the network device server (520). In a preferred embodiment, the capture process is similar to the one described with respect to steps 270 to 290 of FIG. 2, except that the data is backed up from the pseudo disks (560, 595) to a memory buffer, and then restored to the target data storages (540, 595). Any or all the optimisation principles described with respect to FIGS. 1 and 4 can be applied to the configuration shown in FIG. 5. To further optimize the bandwidth usage, multicasting may be used to transfer the block of data from the network device server (520) to the different pseudo disks (560, 590). This configuration has the further advantage that no central server is required to replicate environments directly. This method allows image migration from a physical or virtual source to a physical or virtual target.

Another embodiment comprises a method and system for optimally capturing an image on a physical or virtual environment and transferring it to a target system, by leveraging the capabilities of the operating system residing on the source system to manipulate the file system of the source storage device, and by presenting the target data storage as a local simulated disk to the source environment.

Aspects of the present invention may take the form of an entirely hardware embodiment, an entirely software embodiment or an embodiment containing both hardware and software elements. In a preferred embodiment, the invention is implemented in software, which includes but is not limited to firmware, resident software, micro-code, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system, (or apparatus, or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a first computer, comprising:
a first data storage device storing a file, the file being encoded in a first file system format on the first data storage device;
a processor configured to run a first operating system with a first application suitable for retrieving all file system attributes associated with the file;
logic configured to receive a first message indicating a locator of a second data storage device, the second data storage device being located remotely from the first computer;
logic configured to create a handler to the second data storage device so that the second data storage device appears as a local device to the first computer;
logic configured to instruct the first application to retrieve file data and all file system attributes associated with the file from the first data storage device;
logic configured to instruct a second application to send the retrieved file data and the retrieved file system attributes to the handler so that the file data and the file system attributes are written on the second data storage device; and
logic for formatting the second storage location so that a file system format thereof is the same as the first file system format,
wherein the handler presents the second data storage device as having a size at least equal to the size of the first data storage device, and comprising receiving a master boot record and boot sectors data from the first data storage device; sending the master boot record and boot sectors data to the handler so that the master boot record and boot sectors data is written on the second data storage; receiving a list of excluded files which should not be captured from the first computer; verifying whether the file stored on the first data storage belongs to the list of excluded files; starting the file capture process when the file does not belong to the list of excluded file; and compressing the file data before sending it to the handler, wherein the second data storage device is located remotely from the first computer and connected thereto by a network, wherein the first computer is able to read from and write to the second data storage device when the second data storage device appears as a local device to the first computer.

2. The system of claim 1, further comprising logic configured to compress the file data before sending it to the handler.

3. The system of claim 1, further comprising logic for receiving a message identifying the type of the first operating system; logic for deploying an agent for running a file capture on a second operating system which is of a same type as the first operating system so that the second operating system can manage the first file system format; and logic for booting the second operating system on the first computer so that the agent executes at least the creating and instructing steps.

4. The system of claim 1, wherein the second storage device includes a remote disk.

5. The system of claim 1, wherein the logic for receiving includes a backup application associated with the operating system, and wherein the logic for sending the retrieved file data and the retrieved file system attributes to the handler is performed by a restore application associated with the operating system.

6. The system of claim 1, wherein the first computer is a virtual system and the first data storage device is a virtual disk.

7. The system of claim 1, wherein the handler presents the second data storage device as having a size at least equal to the size of the first data storage device.

8. The system of claim 1, further comprising logic for receiving a master boot record and boot sectors data from the first data storage device; and logic for sending the master boot record and boot sectors data to the handler so that the master boot record and boot sectors data is written on the second data storage.

9. The system of claim 1, further comprising logic configured to receive a list of excluded files which should not be captured from the first computer; logic for verifying whether the file stored on the first data storage belongs to the list of excluded files; and logic for starting the file capture process when the file does not belong to the list of excluded file.

10. The system of claim 1, wherein the first and second applications are different, the first application being a capture agent, the second application being a restore application.

11. A method for capturing a file stored on a first data storage device of a computer system, the method comprising:
receiving a first message indicating a locator of a second data storage device;
creating on a computer system a handler to the second data storage device so that the second data storage device appears as a local device to the computer system, the computer system having a file stored on a first data storage device of the computer system, the file being encoded in a first file system format on the first data storage device, the computer system comprising a first operating system with a first application suitable for retrieving all the file system attributes associated with the file;
instructing the first application to retrieve file data and all file system attributes associated with the file from the first data storage device; and
instructing a second application to send the retrieved file data and the retrieved file system attributes to the handler so that the file data and the file system attributes are written on the second data storage device,
wherein the computer system is a virtual system and the first data storage device is a virtual disk, and
wherein the handler presents the second data storage device as having a size at least equal to the size of the first data storage device, and further comprising receiving a master boot record and boot sectors data from the first data storage device; sending the master boot record and boot sectors data to the handler so that the master boot record and boot sectors data is written on the second data storage; receiving a list of excluded files which should not be captured from the computer system; verifying whether the file stored on the first data storage belongs to the list of excluded files; starting the file capture process when the file does not belong to the list of excluded file; and compressing the file data before sending it to the handler, wherein the second data storage device is located remotely from the computer system and connected thereto by a network, wherein the computer system can read from and write to the second data storage device when the second data storage device appears as a local device to the computer system.

12. The method of claim 11, further comprising receiving a message identifying the type of the first operating system; deploying an agent for running a file capture on a second operating system which is of a same type as the first operating system so that the second operating system can manage the first file system format; and booting the second operating system on the computer system so that the agent executes at least the creating and instructing steps, wherein the second data storage device is located remotely from the computer system and connected thereto by a network, wherein the computer system can read from and write to the second data storage device when the second data storage device appears as a local device to the computer system, wherein the first and second applications are different, the first application being a capture agent, the second application being a restore application.

13. The method of claim 11, wherein the receiving is performed by a backup application associated with the first operating system, wherein a step of sending the retrieved file data and the retrieved file system attributes to the handler is performed by a restore application associated with the first operating system.

14. The method of claim 11, wherein the file data and the file system attributes are received from the second data storage device and sent to the first data storage device.

15. A computer program product, comprising:
a non-transitory computer readable storage medium having computer readable program code embodied therewith, the computer readable program code comprising:
computer readable program code configured to receive a first message indicating a locator of a second data storage device;
computer readable program code configured to create on a computer system a handler to the second data storage device so that the second data storage device appears as a local device to the computer system, the computer system having a file stored on a first data storage device of the computer system, the file being encoded in a first file system format on the first data storage device, the computer system comprising a first operating system with a first application suitable for retrieving all the file system attributes associated with the file;
computer readable program code configured to instruct the first application to retrieve file data and all file system attributes associated with the file from the first data storage device;
computer readable program code configured to instruct a second application to send the retrieved file data and the retrieved file system attributes to the handler so that the file data and the file system attributes are written on the second data storage device, the second application being a different application than the first application; and
computer readable program code configured to compress the file data before sending it to the handler,
wherein the handler presents the second data storage device as having a size at least equal to the size of the first data storage device, and comprising computer readable program code configured to receive a master boot record and boot sectors data from the first data storage device; computer readable program code configured to send the master boot record and boot sectors data to the handler so that the master boot record and boot sectors data is written on the second data storage; computer readable program code configured to receive a list of excluded files which should not be captured from the computer system; computer readable program code configured to verify whether the file stored on the first data storage belongs to the list of excluded files; computer readable program code configured to start the file capture process when the file does not belong to the list of excluded file; and computer readable program code configured to compress the file data before sending it to the handler, wherein the second data storage device is located remotely from the computer system and connected thereto by a network, wherein the computer system is able to read from and write to the second data storage device when the second data storage device appears as a local device to the computer system.

* * * * *